May 12, 1959

S. B. HODGES ET AL 2,886,172

PIPE COUPLING PACKAGE

Filed March 15, 1957

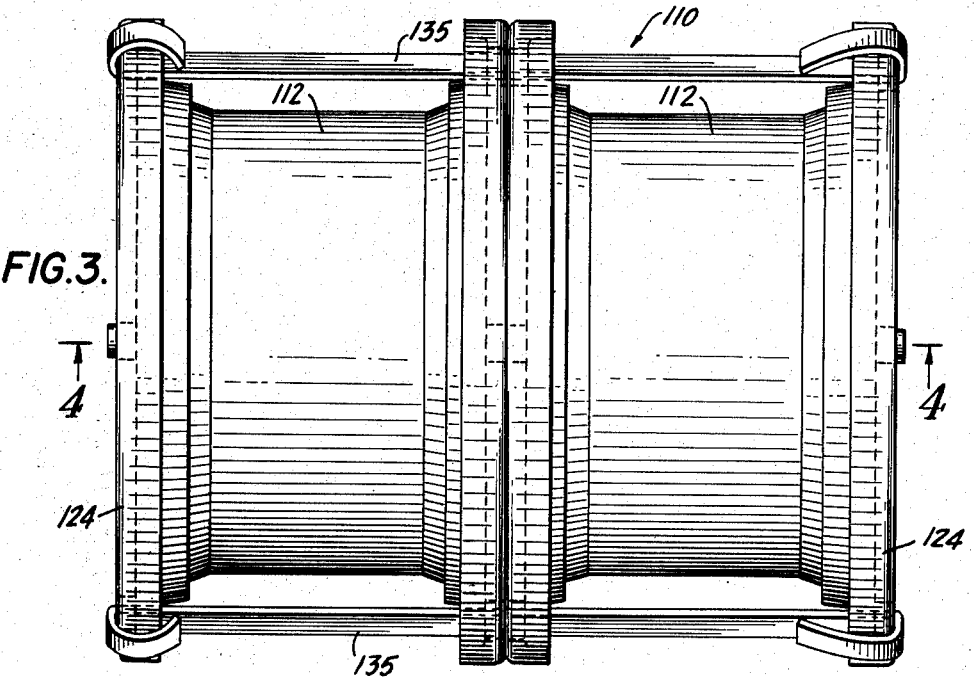
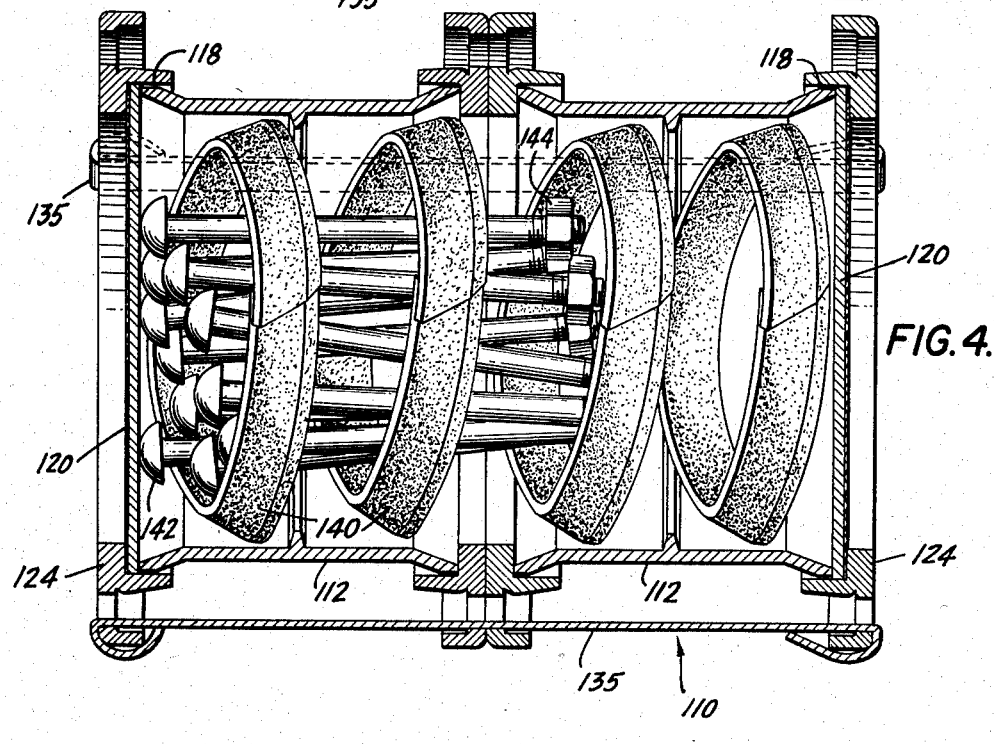

United States Patent Office 2,886,172
Patented May 12, 1959

2,886,172

PIPE COUPLING PACKAGE

Stephen B. Hodges, Willis I. Lewis, and Charles G. Thomas, Bradford, Pa., assignors to Dresser Industries, Inc., Dallas, Tex., a corporation of Delaware Application March 15, 1957, Serial No. 646,386

4 Claims. (Cl. 206—47)

This invention relates to a package and is more particularly concerned with a pipe-coupling package containing in a single unit all of the parts of at least one pipe coupling.

Compression couplings, for example the well known Dresser couplings, are widely used for joining sections of pipe in the construction of long-distance pipe lines for the transmission of oil, gas, water and other pumpable fluids. These couplings generally comprise a tubular sleeve or middle ring and sealing gaskets which are compressed into fluid-tight engagement with the sleeve and the external surface of the pipe sections being joined by means of "followers" which are drawn against the ends of the sleeve by bolts or similar means. Such couplings provide a fluid-tight connection between the axially-aligned pipe sections yet permit the expansion and contraction which is normally encountered in service.

A particular problem exists in this field in connection with the distribution of the couplings to the sites of installation. Compression couplings are used in many and varied areas and on all types of terrain, ranging from urban installations of gas lines and water lines to gas and oil line installations in the prairies and mountains. It will be understood that labor is a very important component of pipe line installation and, in order for manpower to be used most efficiently, it is essential that the installing crews have complete couplings ready for installation at all times regardless of the nature of the area in which they are working. It has been proposed, for example, to ship and distribute the couplings to the installers in a number of separate packages, some containing the middle rings, some containing the followers, some containing the bolts, and some containing the gaskets. If one of these packages should become separated from the others, the entire operation would be brought to a halt since a complete coupling would not be available. Furthermore, even if all packages were on hand, time and man-power are required to bring the various parts of the coupling together into a complete unit ready for installation. It has also been proposed to ship the couplings as assembled units with the bolts holding the followers against the ends of the middle ring and the gaskets in place in the gasket recesses. This proposal, however, has serious practical disadvantages. Firstly, the bolts are exposed and are in constant danger of being bent or of having their threads damaged. Secondly, the gaskets do not remain in place and tend to fall into the middle ring from which they easily become separated and lost. Thirdly, such an arrangement of parts makes a difficult unit to handle and store and one that tends to damage the walls or floors with which it comes in contact. None of these proposals, therefore, provides an effective solution to the problem of shipping and distributing compression couplings, particularly large-size couplings.

It is an object of the present invention to provide a pipe-coupling package which avoids the disadvantages and drawbacks referred to above.

It is another object of the invention to provide a package of the character indicated which embodies all parts of a complete coupling and protects damageable parts from injury and accidental loss.

It is a further object of the invention to provide a pipe-coupling package which is easily transported and stored without injury to surrounding surfaces and which insures that all parts of the coupling will be ready for immediate use upon arrival of the package at the site of installation.

In accordance with the invention there is provided a self-contained unitary package comprising a body portion defined by the middle ring or sleeve of the coupling, and closures extending across the pipe apertures of the middle ring and engaging with the end surface portions of the middle ring, closure clamps defined by the followers of the coupling, locking straps for the closure clamps, and gaskets and bolts confined within the middle-ring. In one embodiment of the invention, two or more middle rings are aligned in axial relationship to define the body portion of the package.

It is a feature of the invention that the pipe-coupling package which is provided contains all of the parts of a complete coupling, and installation may be effected without reference to any other package.

It is another feature of the invention that the damageable portions of the coupling are protected against contact with outside surfaces or objects.

Other objects and features of the invention will be readily apparent from the following detailed description of illustrative embodiments and from the accompanying drawings, wherein, Fig. 1 is a side elevational view of a pipe-coupling package embodying features of the present invention;

Fig. 3 is a side elevational view similar to Fig. 1 of another pipe-coupling package embodying features of the invention and including a plurality of pipe couplings;

Fig. 4 is a vertical cross-sectional view similar to Fig. 2 of the multiple package illustrated in Fig. 3 taken approximately along the line 4—4 in Fig. 3.

Figure 1:
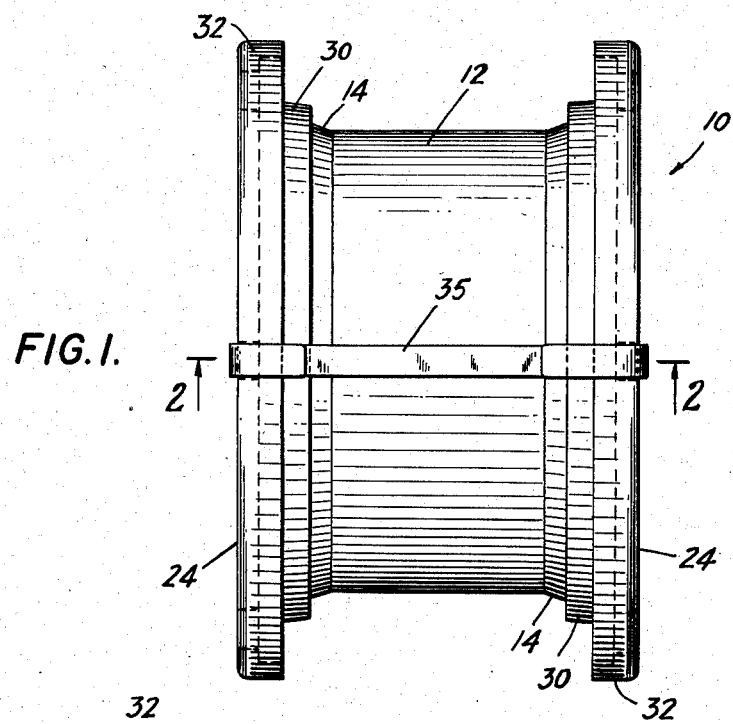
Figure 2:
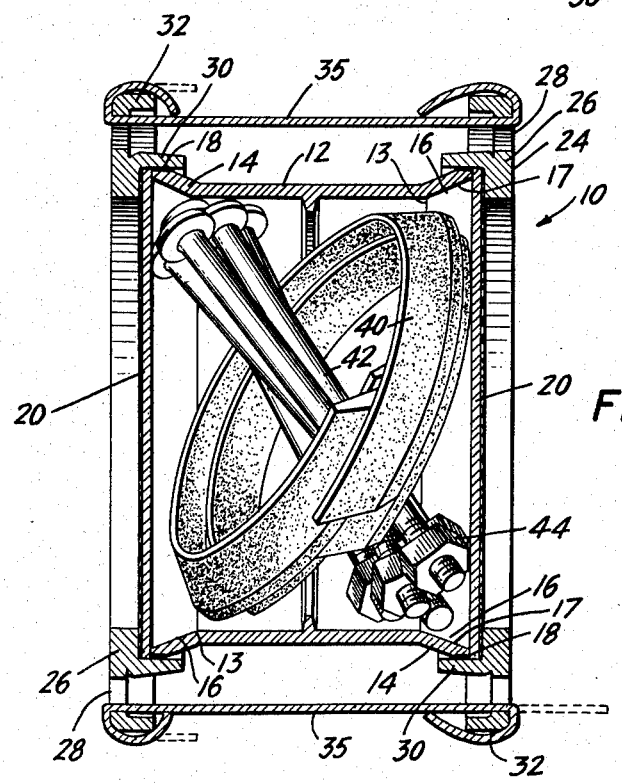
Fig. 2 is a vertical cross-sectional view of the pipe coupling package illustrated in Fig. 1, as seen along a plane passing through the axis of the package, then approximately along the line 2—2 in Fig. 1.

Referring to the drawings, and more particularly to Figs. 1 and 2, the package illustrated, which is designated generally by the reference numeral 10, includes a main tubular body 12 defined by the middle ring of the compression coupling. The body 12 has pipe apertures 13 for reception of the ends of the pipe sections to be coupled and has outwardly-flared ends 14. The ends 14 define gasket recesses 16 having beveled surfaces 17 and have end edge surfaces 18. The open ends of the body 12 which are defined by the end edge surfaces 18 are closed, in the embodiment illustrated, by means of cover members in the form of disc-shaped webs or diaphragms 20 which are suitably formed from thin wood plies overlain by a heavy paper such as kraft paper. The paper may be imprinted with indicia of various types, such as instructions for installation, size data and the like, or the cover members may carry the shipping address. The cover members 20 may, for example, have a thickness of ⅛ in., and preferably have a diameter corresponding to the maximum outside diameter of the ends 14 so that the members 20 will bear against the end edge surfaces 18 and thus close the open ends of the body 12. However, as will be described below, the cover members may have a lesser diameter as long as their diameter is greater than the diameter of the pipe apertures of the coupling sleeve as indicated at 13 in Figs. 1 and 2 so that the cover members will at least engage the beveled surfaces 16 of the gasket recesses. In the embodiment of Figs. 1 and 2, the cover members 20 are held in place and pressed against the ends of the body 12 by means of clamping members which are defined by the followers 24 of the coupling. As shown in the drawings, the followers 24 are annular in form with a main radially-extending body portion 26 provided with circumferentially spaced-apart apertures 28 and an annular axial web portion 30 which is dimensioned to overlie and enclose the outwardly-flared ends 14. In the embodiment illustrated, the followers 24 also have an end reinforcing flange 32. In some couplings, the followers are formed from two or more cooperating arcuate segments having overlapping ends and such followers are readily employed in making the package of the invention.

In accordance with the invention, the clamping members 24 are drawn toward the ends of the body 10 to hold the cover members 20 in place by means of locking straps 35 which are adapted to extend through the apertures 28. As shown in the drawings, the straps 25 are J-shaped and readily pass through the aligned apertures in the clamping members 24 at the ends of the body 12. When the ends of the straps 25 are bent downwardly over the members 24 as shown, a secure, effectively-closed package is provided. In the embodiment shown in Figs. 1 and 2, two locking straps 35 are used and are disposed on diametrically opposite sides of the body 12. It will be understood, however, that additional straps 35 may be used if desired, although as a general rule two or three are generally adequate. The locking straps are formed from strips of malleable iron or like bendable metal. In the case of segmental followers, the locking straps are suitably passed through the apertures defined by the overlapping ends of the follower segments.

Interiorly of the body 12 are disposed the bolts and gaskets required for the complete assembly of the coupling of the package 10. Thus, as seen in Fig. 2, there are provided two gaskets 40 and bolts 42 corresponding in number to the number of bolt apertures 28. In the embodiment illustrated there are six bolts 42, each of which is threadedly engaged by a nut 44. The gaskets are of known construction and are formed from rubber or rubber composition, this term being used generically to include natural and synthetic rubbers and elastomeric compounds, or compositions having like properties and characteristics. The material is relatively firm and solid but sufficiently resilient and elastic to flow under pressure to conform to the surfaces between which it is confined. The gaskets 40 may be continuous annular units or they may be split, as shown. The gaskets and bolts are preferably wedged into place within the body 12 between the cover members 20 so that they will not move about when the package is moved and, if desired, they may be wrapped in paper or cloth wrappings (not shown).

When the coupling is to be installed upon a pipe line, it is merely necessary to remove the locking straps and the cover members and to place the coupling in position. All of the parts needed for installation are at hand and the desired coupling of the pipe sections may be completed in a matter of minutes. The gaskets 40 are seated in the gasket recesses, the bolts 42 are passed through the apertures 28, and the tightening of the nuts 44 upon the bolts causes the followers 24 to press axially-inwardly upon the gaskets 40 to urge them into sealing engagement with the pipe surfaces and with the beveled surfaces 16 of the gasket recesses.

It will be understood that the above-described package is applicable to pipe couplings of all sizes, although it is of particular value for the medium and larger sizes, e.g. couplings for pipes having diameters of one to six feet. In the case of medium-sized couplings, two or more coupling assemblies may be readily combined in a single package. Referring to Figs. 3 and 4, for example, wherein parts corresponding to those shown in the embodiment of Figs. 1 and 2 have been given the same reference numerals to which 100 has been added, the pipe-coupling package 110 is formed from two coupling assemblies of the same size. Thus, two coupling middle rings 112 fitted with followers 124 are placed in end-to-end, axially-aligned position. The free ends of the middle rings 112 are closed by cover members 120 which bear against end edge surfaces 118 and followers 124 bear against the outer surfaces of the cover members. Locking straps 135 are then passed through the aligned apertures 128 of all of the followers, including the two abutting followers at the center of the package, and their ends are bent over to lock the parts in place. Interiorly of the package 110 are found four gaskets 140 and enough bolts 142 and nuts 144 for both couplings. As in the case of the package 10 shown in Figs. 1 and 2, the bolts 142 and gaskets 140 may be wrapped in paper or cloth wrappings (not shown). It will be understood that three or more couplings may be similarly packaged together with the middle rings of the several couplings positioned in axially-aligned relationship in the manner shown in Figs. 3 and 4.

Figure 5:
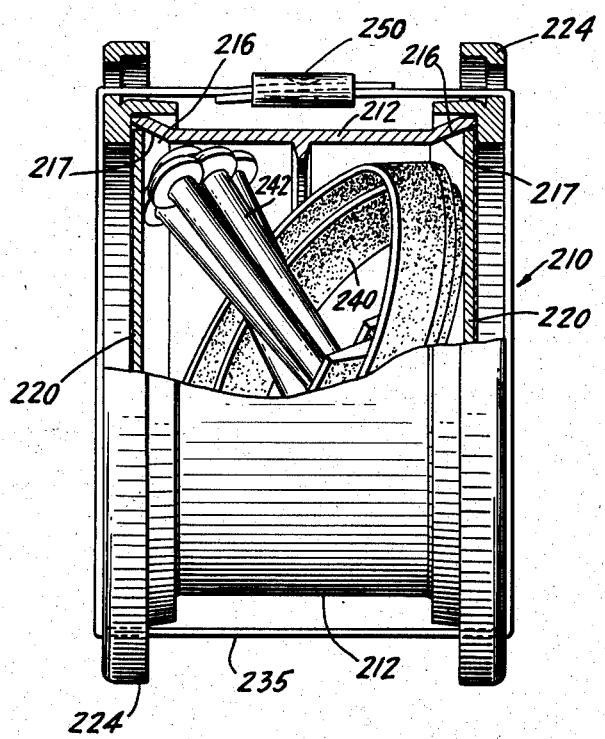
Fig. 5 is a side elevational view, partly in section, of a further modified package construction in accordance with the invention.

It will also be understood that the form and arrangement of the locking straps may be varied to a considerable extent. For example, instead of having two separate straps as shown in Figs. 1 and 2, a single continuous strap extending entirely around the package may be employed. As previously mentioned, the cover members need not necessarily engage the end edge surfaces of the coupling sleeve but may be of a lesser diameter such that they enter the gasket recesses and engage the tapered or beveled surfaces of the recesses. Thus, referring to Fig. 5, wherein parts corresponding to those shown in Figs. 1 and 2 have been given the same reference numerals to which 200 has been added, the package 210 is composed of a body 212, cover members 220, clamping members 224, bolts 242 and gaskets 240. Each cover member 220 has a diameter which is less than the maximum diameter of the associated gasket recess 216 so that the peripheral edge of the cover member engages the tapered wall 217 of the recess. The diameter of the cover members may be less than that illustrated in Fig. 5 so that the cover members enter the gasket recesses 216 even further but the diameter is greater than the diameter of the pipe apertures 213 so that the cover members will engage at least the innermost portion of the gasket recess walls. The clamping members 224 are drawn against the ends of body 212 by means of a single locking strap 235 formed from any strong yet flexible material, such as spring steel. The ends of the locking strap 235 are interconnected by a clasp 250 which may be a conventional friction clasp such as used in baling, or the like.

While the invention has thus been illustrated and described with reference to certain preferred embodiments thereof, it will be obvious that various changes and modifications in addition to those above mentioned may be made without departing from the scope of the invention as defined in the appended claims. It will further be understood that, insofar as they are not mutually incompatible, the various features and details of construction of the several embodiments shown and described are interchangeable with one another. It is intended, therefore, that all matter contained in the foregoing description and in the drawings shall be interpreted as illustrative only and not as limitative of the invention.

What we claim and desire to secure by Letters Patent is:

1. A pipe-coupling package providing the parts required for the assembly of at least one coupling and comprising, in combination, a tubular body portion defined by the middle ring of the coupling, said middle ring having open ends defining pipe apertures and gasket recesses adapted to receive an annular gasket, end closures extending across the pipe apertures of the middle ring and engaging with the end portions of the middle ring, closure clamps defined by the followers of the coupling overlying the radially-outer portions of the axially outer surface of said end closures, said closure clamps being annular in form and being provided with circumferentially spaced-apart apertures and shaped to cooperate with each of said pipe apertures to confine a gasket in the gasket recess and apply sealing pressure thereto to urge said gasket radially inwardly toward the axis of said tubular body portion, locking means drawing said clamps axially inwardly in relation to said body portion to confine the end closures between the clamps and the adjacent surfaces of the middle ring, and bolts, gaskets, and like components required for the assembly of said at least one coupling confined in the enclosure defined by said middle ring and said end closures, said bolts being effective to draw said clamps axially inwardly to compress said gaskets in said recesses in the absence of said end closures.

2. A pipe-coupling package comprising, in combination, a tubular body portion defined by the middle ring of the coupling, said middle ring having open ends defining pipe apertures and gasket recesses adapted to receive an annular gasket, disc-shaped end closures extending across the pipe apertures of the middle ring and being dimensioned to engage with the end portions of the middle ring and having a thickness substantially less than the wall thickness of said body portion, closure clamps defined by the followers of the coupling overlying the radially-outer portions of the axially outer surface of said end closures, said closure clamps being annular in form and being provided with circumferentially spaced-apart apertures and shaped to co-operate with each of said pipe apertures to confine a gasket in the gasket recess and apply sealing pressure thereto to urge said gasket radially inwardly toward the axis of said tubular body portion, locking means extending between some of said apertures drawing said clamps axially inwardly in relation to said body portion to confine the end closures between the clamps and the adjacent surfaces of the middle ring, and gaskets and bolts for said coupling confined in the enclosure defined by said middle ring and said end closures, said bolts being effective to draw said clamps axially inwardly to compress said gaskets in said recesses in the absence of said end closures.

3. A pipe-coupling package comprising, in combination, a tubular body portion defined by the middle ring of the coupling, said middle ring having open ends defining pipe apertures and gasket recesses adapted to receive an annular gasket, disc-shaped end closures extending across the pipe apertures of the middle ring and being dimensioned to engage with the end edges of the middle ring, closure clamps defined by the followers of the coupling bearing against the axially outer surface of said end closures, said closure clamps being annular in form and being provided with circumferentially spaced-apart apertures and shaped to cooperate with each of said pipe apertures to confine a gasket in the gasket recess and apply sealing pressure thereto to urge said gasket radially inwardly toward the axis of said tubular body portion, locking straps extending between some of said apertures drawing said clamps against said end closures to bring the end closures into bearing engagement with the said end edges of the middle ring, and gaskets and bolts for said coupling confined in the enclosure defined by said middle ring and said end closures, said bolts being effective to draw said clamps axially inwardly to compress said gaskets in said recesses in the absence of said end closures.

4. A pipe-coupling package providing the parts required for the assembly of a plurality of couplings and comprising, in combination, a tubular body portion defined by a plurality of coupling middle rings disposed in axially-aligned position, said middle rings having open ends defining pipe apertures and gasket recesses adapted to receive an annular gasket, end closures extending across the exposed pipe apertures of the middle rings and engaging with the exposed end portions of the middle rings, closure clamps defined by the followers of the coupling overlying the axially outer surface of said end closures, said closure clamps being annular in form and being provided with circumferentially spaced-apart apertures and shaped to cooperate with each of said pipe apertures to confine a gasket in the gasket recess and apply sealing pressure thereto to urge said gasket radially inwardly toward the axis of said tubular body portion, locking means for the closure clamps drawing said clamps axially-inwardly in relation to said middle rings to confine said end closures between said clamps and said middle rings, and bolts, gaskets, and like components required for the assembly of said coupling confined in the enclosure defined by said middle rings and said end closures, said bolts being effective to draw said clamps axially inwardly to compress said gaskets in said recesses in the absence of said end closures.

References Cited in the file of this patent

UNITED STATES PATENTS

| 550,094 | Blundell | Nov. 19, 1895 |
| 1,802,716 | Howcott | Apr. 28, 1931 |
| 2,121,511 | Schlesinger | June 21, 1938 |